United States Patent [19]
Woehleke

[11] Patent Number: 5,797,993
[45] Date of Patent: Aug. 25, 1998

[54] EXPANDABLE PIPELINE PIG ASSEMBLY

[75] Inventor: Steven P. Woehleke, Moraga, Calif.

[73] Assignee: Chevron U.S.A. Inc., San Francisco, Calif.

[21] Appl. No.: 895,290

[22] Filed: Jul. 16, 1997

[51] Int. Cl.$^6$ .................................................. B08B 9/04
[52] U.S. Cl. .................... 134/8; 134/22.12; 15/104.17; 15/104.19; 15/104.061
[58] Field of Search .................. 15/104.17, 104.18, 15/104.19, 104.061; 134/8, 22.11, 22.12

[56] References Cited

U.S. PATENT DOCUMENTS

| | | | |
|---|---|---|---|
| 1,026,525 | 5/1912 | McKeez | 15/104.19 |
| 1,315,849 | 9/1919 | MacDonald | 15/104.19 |
| 2,018,124 | 10/1935 | Forster | 15/104.19 |
| 2,508,659 | 5/1950 | Brown | 15/104.061 |
| 3,576,043 | 4/1971 | Zongker. | |
| 3,890,665 | 6/1975 | Richardson. | |
| 4,481,816 | 11/1984 | Prentice. | |
| 4,495,808 | 1/1985 | Fischer, III. | |
| 4,538,316 | 9/1985 | Reinhard et al. | |
| 4,827,553 | 5/1989 | Turpin, Sr. | 15/104.18 |
| 4,844,165 | 7/1989 | Van Der Steeg. | |
| 5,208,937 | 5/1993 | Cooper. | |
| 5,296,039 | 3/1994 | Cooper. | |
| 5,457,841 | 10/1995 | Minton | 15/104.061 |

OTHER PUBLICATIONS

Chris F. Kershaw, "Design and development of a 24–in/34–in dual–diameter pig for an offshore crude–oil export pipeline incorporating a wye piece", The Pipeline Pigging Conference, Feb. 13–16, 1995.

Primary Examiner—Randall E. Chin
Attorney, Agent, or Firm—Timothy J. Hadlock

[57] ABSTRACT

The invention is an expandable pipeline pig for separating different liquids and gases in a flexible oil/gas export riser feeding to a larger diameter rigid oil/gas export pipeline. The invention includes a cylindrical body member; a front plate member, a center portion of which is fixedly attached to a front portion of elongated cylindrical body member; a rear plate member, a center portion of which is fixedly attached to a rear portion of elongated cylindrical body member; a collar member slidably disposed about elongated cylindrical body member, the collar member has an outer portion forming a ring about of the elongated cylindrical body member; front rib members, which have front-end portions pivotably attached to a rear side portion of the front-end plate, and where the point of such pivotable attachments is radially equidistant about the elongated cylindrical body member; rear strut members which have front-end portions and rear-end portions; at least one bias means for moving the front and rear strut members toward the front of the elongated cylindrical body member, which deploys the front and rear rib members; a front diaphragm member, where radial portions of the front diaphragm member are flexibly attached to the front rib members a front seal member flexibly attached to outer circumference portions of the front diaphragm member; a rear diaphragm member, where radial portions of the rear diaphragm member are flexibly attached to the rear rib members; a rear seal member flexibly attached to outer circumference portions of the front diaphragm member.

20 Claims, 10 Drawing Sheets

EXPANDABLE PIPELINE PIG ASSEMBLY

I. FIELD OF THE INVENTION

The present invention relates to an expandable pipeline pig assembly, especially one suitable for separation of liquids passing into a flexible export riser which feeds to a larger diameter seafloor rigid export pipeline.

II. BACKGROUND OF THE INVENTION

Mechanical pigs are used to provide a fluid separation and to clean the walls in pipeline bores. Current mechanical pigs have limited capability to transition from a small bore diameter to a larger bore diameter. Some known pipeline pigs, e.g., U.S. Pat. No. 3,890,665, can have inflatable "balloon-like" bodies. These types of pigs can deform to various shapes. Such ability to deform allows these pigs to go through pipelines having a non-uniform inner diameter. However, these have the possibility of low reliability due to possible puncture or tearing of the "balloon".

Other known pipeline pigs used for cleaning have two sizes of diaphragms, e.g., U.S. Pat. No. 5,457,841. The outer diaphragm extends to the walls of a larger pipeline and then folds to the size of the smaller diaphragm when in a narrower pipeline. Due to the needed balance of rigidity in the expanded position for the larger pipeline and flexibility when in the narrower pipeline, this type of pig is limited to uses where the larger pipeline is not much larger than the narrower pipeline. For example, some known diaphragms/pipeline pigs of this type are only capable of use in transfer from a 10" I.D. pipe to a 12" I.D. pipe or from a 20" I.D. pipe to a 24" I.D. pipe.

For offshore production platforms to maximize output and efficiency, it is desirable to have as large of export riser and seafloor pipelines as possible. Fixed platforms, i.e., ones rigidly attached to the seafloor, are typically able to use rigid piping for the export riser. Rigid piping is commercially available in a variety of large diameter sizes. For floating platforms, however, flexible export risers are necessary. This is due to the horizontal, vertical, and other movements of a floating platform.

A current industry trend in offshore oil/gas exploration and production is go to deeper and deeper operations, e.g., in the Gulf of Mexico. Thus, the platforms used in those operations will necessarily be floating platforms and will often use flexible export risers. Due to the complexities of having both adequate strength, durability, and flexibility, the largest commercially available export risers are of a limited maximum diameter, e.g., 16"–18" I.D. This maximum diameter is smaller than that available for rigid riser piping. In contrast to flexible export risers, seafloor export pipelines need not be flexible whether used in conjunction with a fixed platform or a floating platform. Seafloor export pipelines are typically made of rigid, e.g., steel, piping. Rigid seafloor pipeline is commercially available in larger diameters than the largest diameter flexible export risers.

An example of where a fluid separation pipeline pig is useful is when the oil or gas being produced contains corrosive elements. To minimize the corrosive effect of such element, the export riser and seafloor pipeline should be flushed and coated with an anti-corrosive chemical agent. Use of pipeline pigs provides segregation between the anti-corrosion agent and the oil or gas production. Thus, a first pig is inserted into the top of the export riser. The anti-corrosion agent is added behind this first pig. A second pig is inserted behind the anti-corrosion agent and the production oil or gas continues to be pumped behind the second pig. The two pigs are removed at a later point in the pipeline. Thus, the pigs help ensure coating the entire inner pipeline surface with the anti-corrosion agent.

Since the export riser going from the production platform to the seabed is of smaller diameter than the seafloor pipeline, it would be desirable to have a mechanical pig having the capability to significantly increase its diameter, e.g., from about 50% to 100% or greater, e.g., from about 16" I.D. riser to about 32" I.D. pipeline, when passing from the narrower export riser to the larger seafloor pipeline. Alternative benefits of such a pig to providing liquid separation is to provide cleaning of the inner walls of the pipelines or export risers. The addition of scraping elements to the outer circumference of the front and rear plates and/or front and rear ribs and/or diaphragms would facilitate cleaning deposits on the inner walls of a pipeline. Another use is for the pig to contract from a larger diameter pipeline to a connected smaller diameter pipeline.

Such a pig may be applicable for floating systems in which the subsea pipeline is normally connected to the floating facility via a flexible riser. Being able to pig the submarine pipeline through a smaller-diameter flexible riser would enhance the viability of cost-effective facility configurations, thus significantly decreasing the project capital costs. Such a pig may have other beneficial applications since other common piping configurations also involve smaller diameter piping feeding into larger diameter piping. One such configuration is where multiple "branch" lines feed into a single "trunk" line.

The expandable pipeline pig of this invention provides the desired benefits discussed above. The expandable pipeline pig may be applicable to other offshore projects as floating systems and flexible risers are becoming much more common.

III. SUMMARY OF THE INVENTION

The invention, in one embodiment, is an expandable pipeline pig for separating different liquids and gases in a flexible oil/gas export riser feeding to a larger diameter rigid oil/gas export pipeline, the expandable pipeline pig including:

1. a cylindrical body member;
2. a front plate member, a center portion of which is fixedly attached to a front portion of elongated cylindrical body member;
3. a rear plate member, a center portion of which is fixedly attached to a rear portion of elongated cylindrical body member;
4. a collar member slidably disposed about elongated cylindrical body member, the collar member:
   (a) having an outer portion forming a ring about of the elongated cylindrical body member;
5. front rib members:
   (a) having front-end portions pivotably attached to a rear side portion of the front end plate; and
   (b) where the point of such pivotable attachments is radially equidistant about the elongated cylindrical body member;
6. rear strut members having front end portions and rear end portions:
   (a) where the front portions are pivotably attached to outer portions of the collar member, where the point of such pivotable attachments is radially equidistant about the elongated cylindrical body member;
   (b) where such attachment points of the rear end portion of the front strut members substantially correspond to

3 the radial point of attachment of the front-end portions of the front rib members which are pivotably attached to a rear side portion of the front end plate;

7. at least one bias means for moving the front and rear strut members toward the front of the elongated cylindrical body member, thereby deploying the front and rear rib members;

8. a front diaphragm member, where radial portions of the front diaphragm member are flexibly attached to the front rib members;

9. a front seal member flexibly attached to outer circumference portions of the front diaphragm member;

10. a rear diaphragm member, where radial portions of the rear diaphragm member are flexibly attached to the rear rib members;

11. a rear seal member flexibly attached to outer circumference portions of the front diaphragm member; and 12. where the elements are so disposed such that sliding the front and rear strut members toward the front of the elongated cylindrical body member, due to expansion of the bias means, results in pivoting the rear end portions of the front and rear rib members outward from elongated cylindrical body member such as occurs when opening an umbrella.

The invention, in another embodiment, is a method for separating different liquids and gases in a flexible oil/gas export riser which feeds to a larger diameter rigid oil/gas export pipeline. The method includes:

(a) passing an expandable pipeline pig in a retracted position into the export riser;

(b) passing the expandable pipeline pig from the export riser into the larger diameter rigid oil/gas export pipeline;

(c) expanding the expandable pipeline pig; and (d) where the expandable pipeline pig is the expandable pig described above.

IV. BRIEF DESCRIPTION OF THE DRAWING

V. DETAILED DESCRIPTION OF THE PREFERRED EMBODIMENTS

The above discussed benefits and other aspects of the invention and advantages to be obtained therefrom will be more apparent from the following detailed description.

4

A. Description Of The Elements With Reference To The Figures

The elements for the expandable pipeline pig assembly and corresponding reference numbers are listed in Table 1 below. In the section following this one, each element and how it relates to the other elements is described in detail with reference to the figures. The reference numbers were selected so that the first digit corresponds to the first figure in which the element clearly appears. For example, cylindrical body member 110 first appears in FIG. 1. Although the cylindrical body member appears in later figures, it is numbered 105 in all figures since it is the same element.

TABLE 1

| Element Name | Reference Number Used In Figures |
|---|---|
| A cylindrical body member | 105 |
| A front plate member | 110 |
| A front-plate seal member | 115 |
| A rear plate member | 120 |
| A rear-plate seal member | 125 |
| A collar member | 130 |
| A piston member | 135 |
| A piston end-plate member | 140 |
| Front rib members | 145 |
| Front strut members | 150 |
| Rear rib members | 155 |
| Rear strut members | 160 |
| A spring member | 165 |
| A front diaphragm member | 405 |
| A front seal member | 410 |
| A rear diaphragm member | 305 |
| A rear seal member | 310 |
| External-forward spring member | 565 |
| External-rear spring member | 865 |

B. Organization

Figure 1:
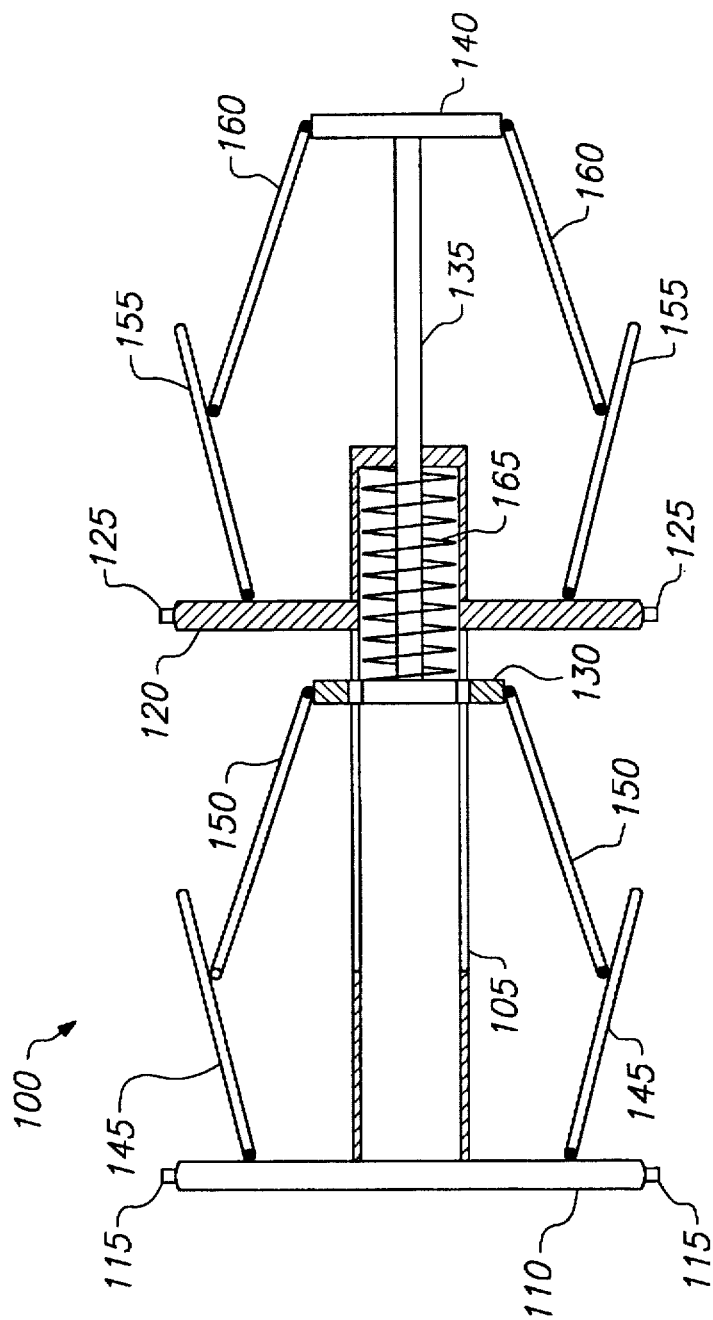
FIG. 1 is a side elevation view of one embodiment of the invention in the collapsed position.
Figure 2:
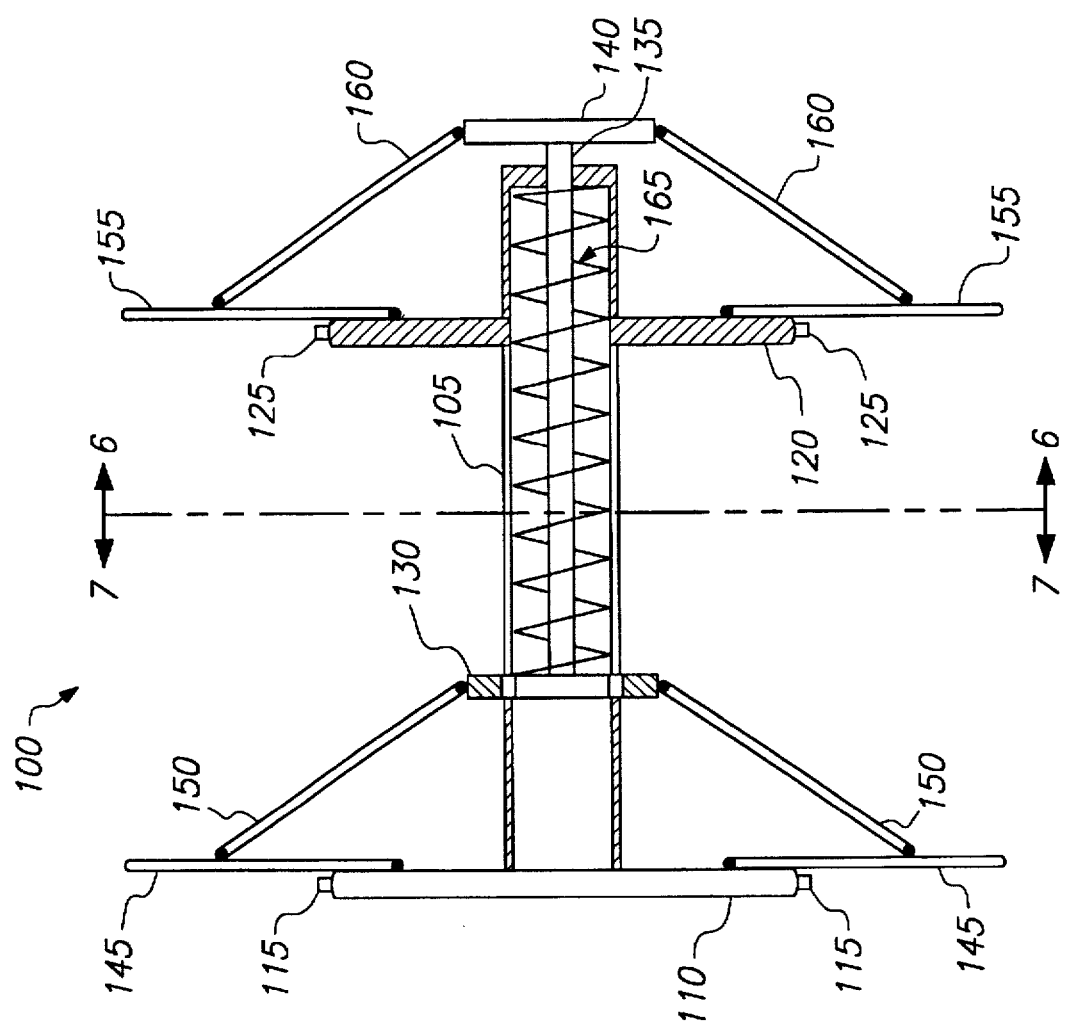
FIG. 2 is a side elevation view of another one embodiment of the invention in the expanded position.

With reference to the drawings, and FIGS. 1 and 2 in particular, therein is depicted a particularly preferred form of an expandable pipeline pig 100. Nearly all elements of the expandable pipeline pig 100 are arranged radially about elongated cylindrical body member 105. A portion of the expandable pipeline pig may be viewed as two plates (i.e., front-plate member 110 and rear-plate member 120) joined by a cylindrical tube (i.e., cylindrical body member 105). The plates have elastomeric seals 115 and 125 around their circumference. The plates, together with seals, are sized to provide the sealing means within a smaller bore conduit (e.g., flexible riser).

More particularly, a center portion of the rear side of front plate member 110 is fixedly attached to a front portion of elongated cylindrical body member 105. Front-plate seal member 115 is fixedly disposed about the extreme perimeter of front plate member 110. A center portion of rear plate member 120 is fixedly attached to a rear portion of elongated cylindrical body member 105. Typically, rear plate member 120 has a circular opening in its central portion. The inner diameter of the opening is substantially similar to the outer diameter of elongated cylindrical body member 105. Thus, in this embodiment, rear plate member 120 is fixedly attached about an inner diameter portion of the central circular opening to an outer diameter portion of the elongated cylindrical body member 105. Rear-plate seal member 125 is fixedly disposed about an extreme perimeter portion of rear plate member 120.

In one embodiment, one or more slots, typically 2 or more, run along the longitudinal axis of elongated cylindrical body member 105. The slots begin a point in front of the rear plate member 120 and run forward to a point to the rear of the front plate member 110. Collar member 130 is slidably disposed about elongated cylindrical body member 105. In brief, collar member 130 is configured for moving the diaphragm members (discussed below) from retracted position to deployed position.

In more detail, an outer portion (alternatively called an "exterior" portion, i.e., on the exterior of the elongated cylindrical body member 105) of collar member 130 forms a ring about elongated cylindrical body member 105. Collar member 130 is positioned along said elongated cylindrical body member 105 behind said front plate member 110 and in front of said rear plate member 120. The outer portion of collar member 130 is fixedly or integrally attached through the longitudinal slots to an inner portion (or "interior" portion, i.e., inside the elongated cylindrical body member 105) of collar member 130 inside elongated cylindrical body member 105. Alternatively, there is no inner portion of collar member 130. In that alternative embodiment, the longitudinal slots located along part of the cylindrical body member 105 serve to allow connection of the collar member 130 to the piston member 135. Piston member 135 is discussed below.

Piston member 135 typically is an elongated rigid structure such as a rod. A front portion of piston member 135 is fixedly attached to the inner portion of collar member 130. The opposite end of piston member 130 extends beyond the rear portion of elongated cylindrical body member 105. A center portion of one side of piston end-plate member 140 is fixedly attached to a rear portion of piston member 130. A portion of the rear portion of piston member 130 extends beyond the rear portion of elongated cylindrical body member 105. Piston end-plate member 140 is fixedly attached to this rear portion piston member 130 which extends beyond the rear portion of elongated cylindrical body member 105.

Spring member 165 is disposed within the interior of said elongated cylindrical body member and radially about said piston member 135.

In brief, the rib members, 145 and 155, are spaced radially around each of the two plates, 115 and 125, and are for deploying and restraining the diaphragm members, 405 and 305.

More particularly, front-end portions of front rib members 145 are pivotably attached to a rear side portion of front plate 110. The point of such pivotable attachments is radially equidistant about the elongated cylindrical body member 105. Rear end portions of front strut members 150 are pivotably attached to outer portions of the collar member 130. The point of such pivotable attachments is radially equidistant about the elongated cylindrical body member 105. Such attachment points of the rear end portion of front strut members 150 substantially correspond angularly to the radial point of attachment of the front-end portions of front rib members 145 which are pivotably attached to a rear side portion of front plate 110.

Front-end portions of front strut members 150 are then pivotably attached to mid- to rear-portions of front rib members 145. The arrangement is such that sliding the collar member 130 toward the front of elongated cylindrical body member 105, due to expansion of spring member 165, results in pivoting the rear end portions of front rib members 145 outward from elongated cylindrical body member 105 such as occurs when opening an umbrella.

Front-end portions of rear rib members 155 are pivotably attached to a rear side portion of rear plate member 120. The point of such pivotable attachments is radially equidistant about the elongated cylindrical body member 105. Rear end portions of rear strut members 160 are pivotably attached to outer portions of piston end-plate member 140. The point of such pivotable attachments is radially equidistant about the elongated cylindrical body member 105. Such attachment points of the rear end portion of rear strut members 160 substantially correspond angularly to the radial point of attachment of the front-end portions of rear rib members 155 which are pivotably attached to a rear side portion of rear plate member 120.

Front-end portions of rear strut members 160 are then pivotably attached to mid- to rear-portions of rear rib members 155. The arrangement is such that sliding the collar member 130 toward the front of elongated cylindrical body member 105, due to expansion of spring member 165, results in pivoting the rear end portions of rear rib members 155 outward from elongated cylindrical body member 105 such as occurs when opening an umbrella. Spring member 165 typically is a helical spring. The pivotable connections mentioned above are by any conventional method such as by connection to fixed or integral flanges (not shown) on the connecting portions.

This paragraph provides an overview of the diaphragms and corresponding seals. Two diaphragms, 405 and 305, optionally, made of steel wire or synthetic fiber reinforced elastomeric, each with, optionally, a semi-rigid elastomeric seal, 410 and 310, around its outer circumference. The diaphragms and seals are sized to provide the sealing means within the larger (outer) bore (e.g., submarine pipeline). The seals are optionally polyurethane or another plastic which, optionally, include embedded spring steel to provide greater radial strength. The seals (for both inner and outer bores) preferably have ridges to facilitate sealing in the pipeline.

Figure 3:
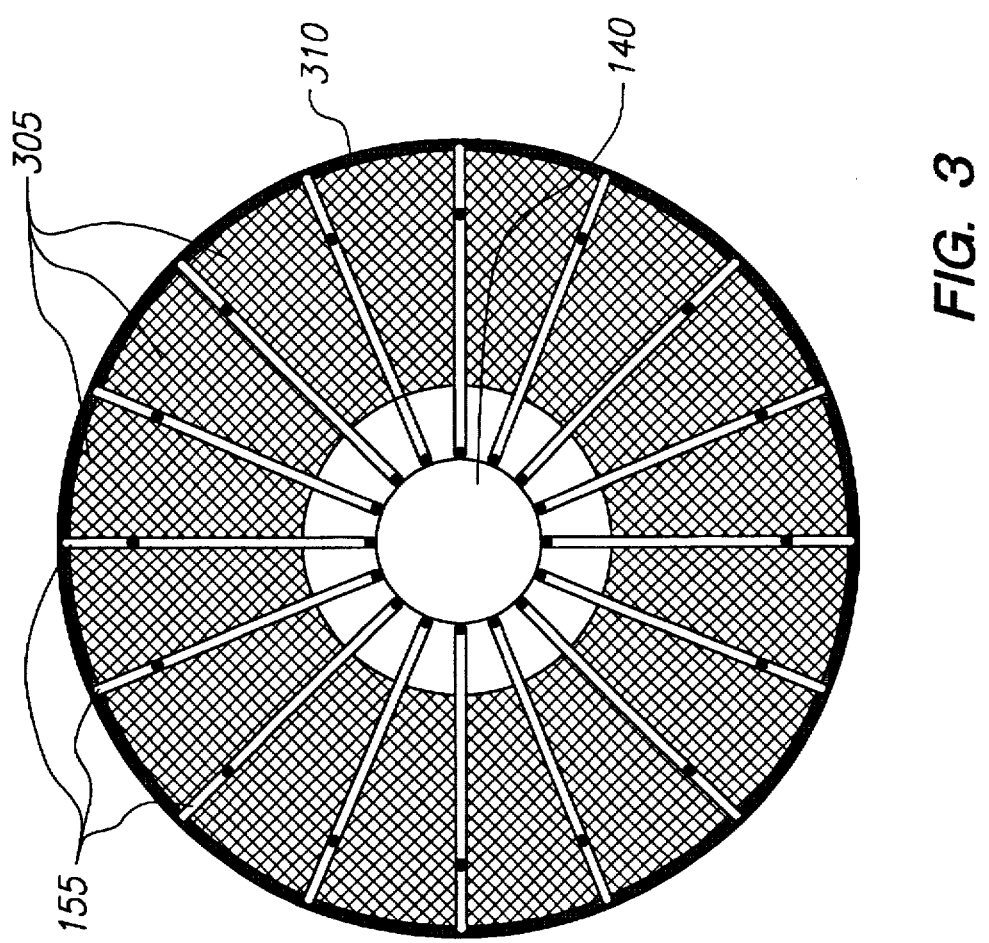
FIG. 3 is a back end view of one embodiment of the invention.

More particularly, FIG. 3 depicts a rear end view of one embodiment of the expandable pipeline pig 100. One end of each of rear rib members 155 are pivotably attached equidistant about, and radially to, outer circumferential portions of piston end-plate member 140. Radial portions of rear diaphragm member 305 are flexibly attached to rear rib members 155. Rear seal member 310 is flexibly attached to outer circumference portions of rear diaphragm member 305 and, optionally, to end portions of rear rib members 155 opposite the end portions of rear rib members 155 pivotably attached to piston-end plate member 140.

Figure 4:
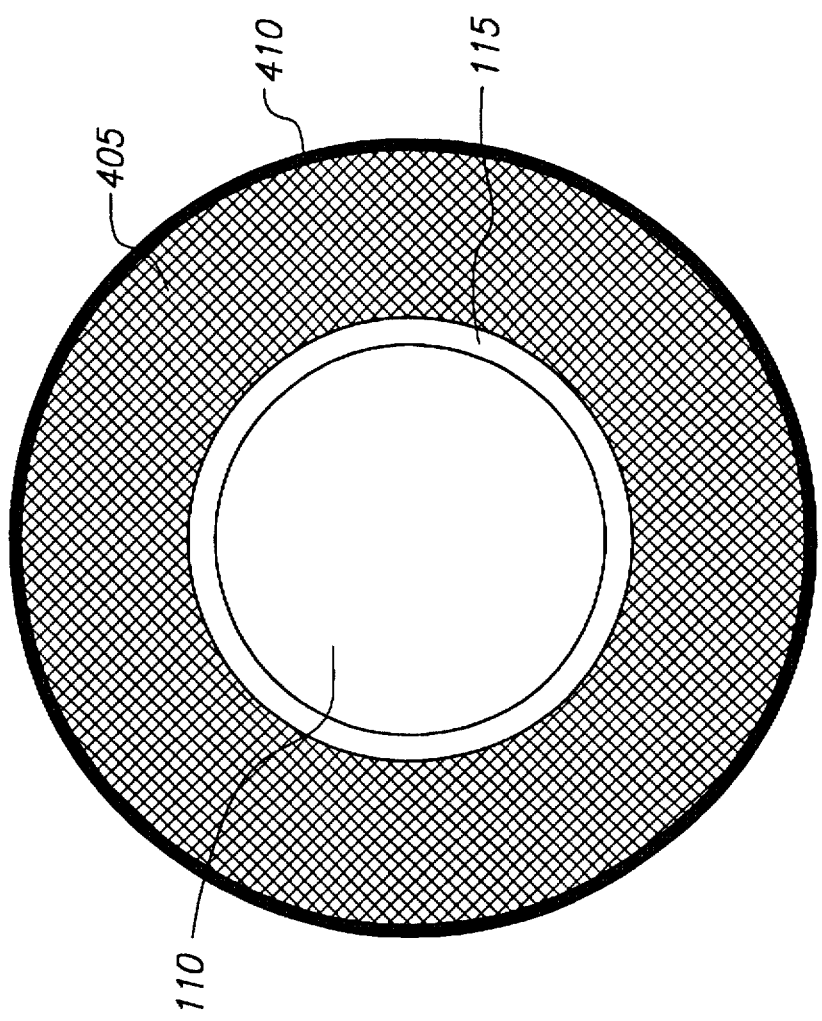
FIG. 4 is a front end view of one embodiment of the invention.

FIG. 4 depicts a front end view of one embodiment of the expandable pipeline pig 100. One end of each of front rib members 145 are pivotably attached equidistant about, and radially to, outer circumferential portions front plate member 110. Radial portions of front diaphragm member 405 are flexibly attached to front rib members 145. Front seal member 410 is flexibly attached to outer circumference portions of front diaphragm member 405 and, optionally, to end portions of front rib members 145 opposite the end portions of front rib members 145 pivotably attached to front plate member 110.

Figure 5:
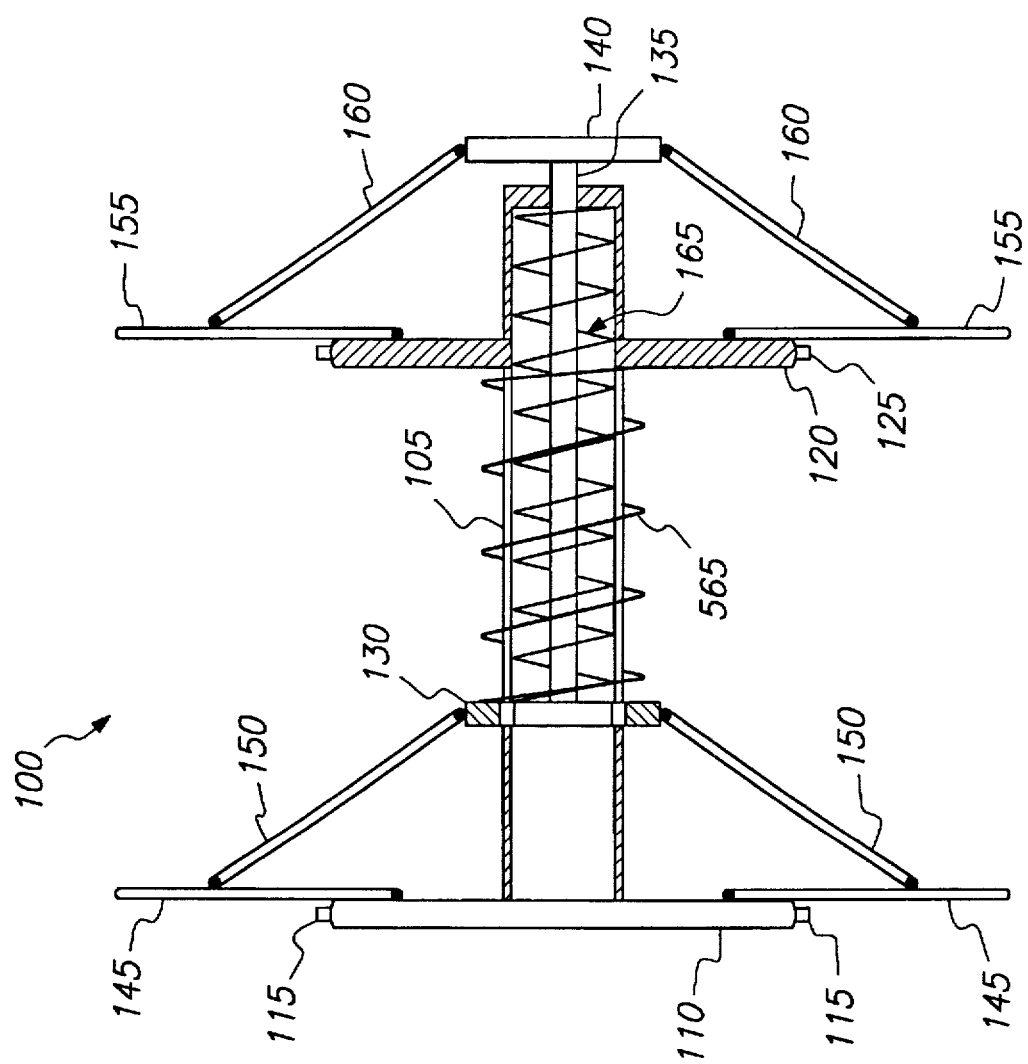
FIG. 5 is another side elevation view of one embodiment of the invention in the expanded position, showing an external-forward spring.
Figure 6:
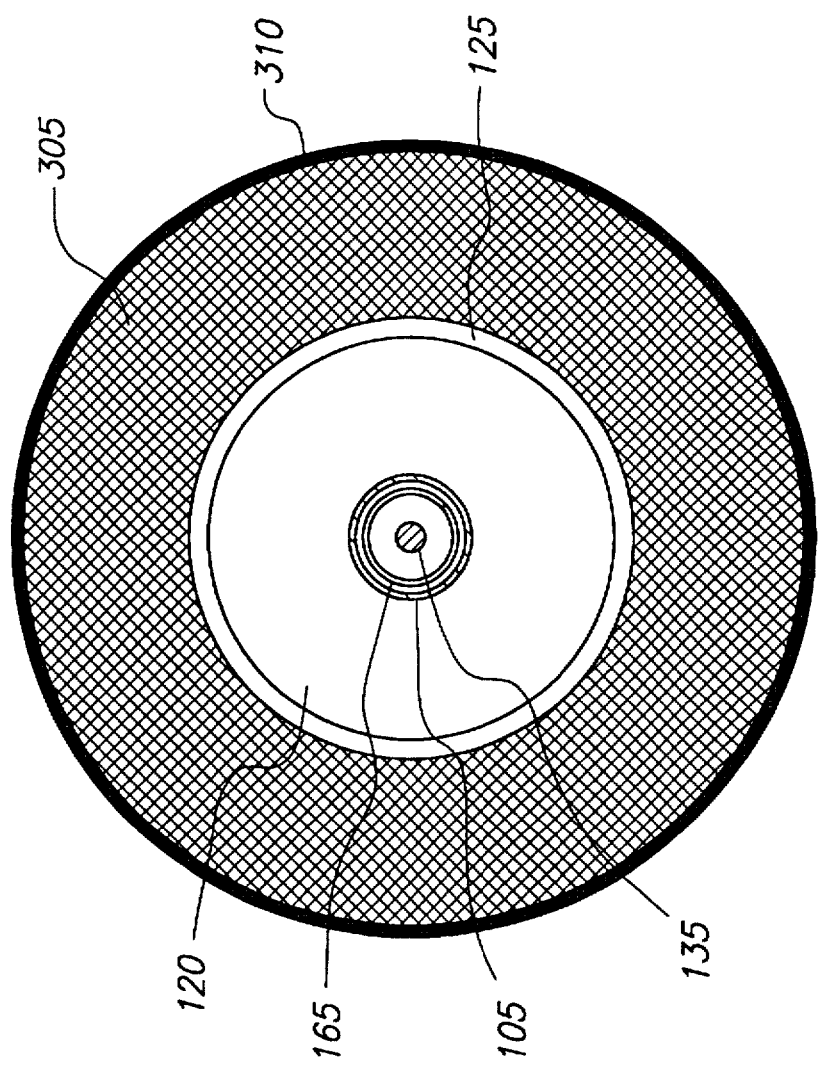
FIG. 6 is a back-facing cross-sectional view of one embodiment of the invention taken along sectional line 6—6 of FIG. 2.
Figure 7:
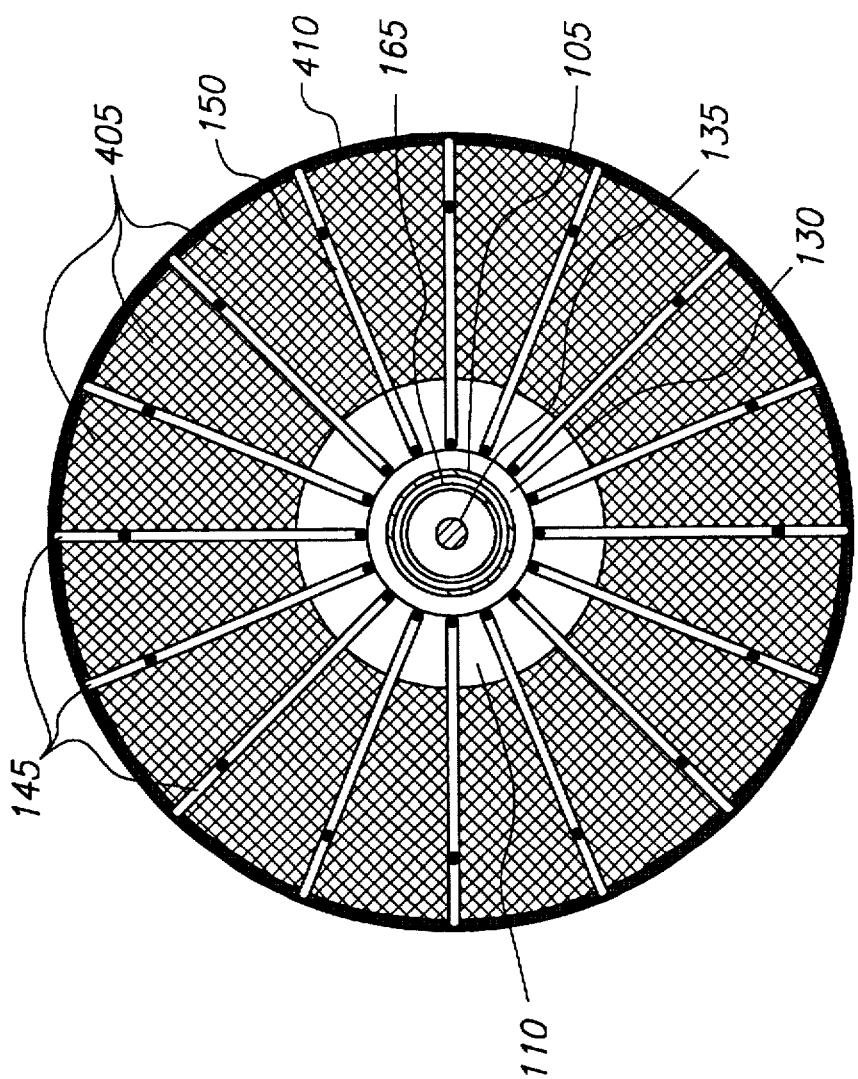
FIG. 7 is a front-facing cross-sectional view of one embodiment of the invention taken along sectional line 7—7 of FIG. 2.

FIG. 5 is another side elevation view of one embodiment of the invention in the expanded position, showing an external-forward spring 565. FIG. 6 is a back-facing cross-sectional view of one embodiment of the invention taken along section line 6—6 of FIG. 2. FIG. 7 is a front-facing cross-sectional view of one embodiment of the invention taken along section line 7—7 of FIG. 2.

Figure 8:
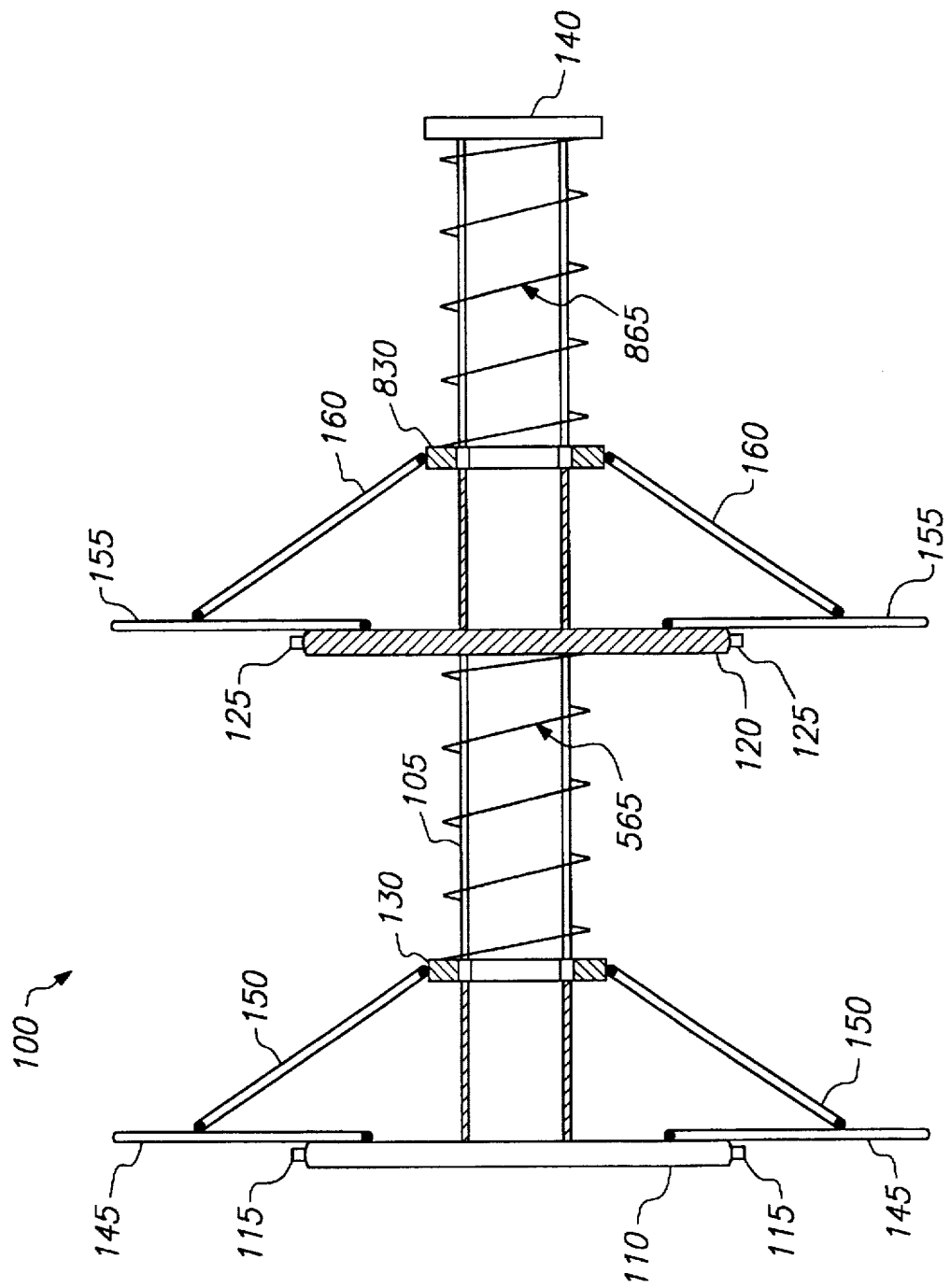
FIG. 8 is another side elevation view of one embodiment of the invention in the expanded position, showing forward and rear external springs.
Figure 9:
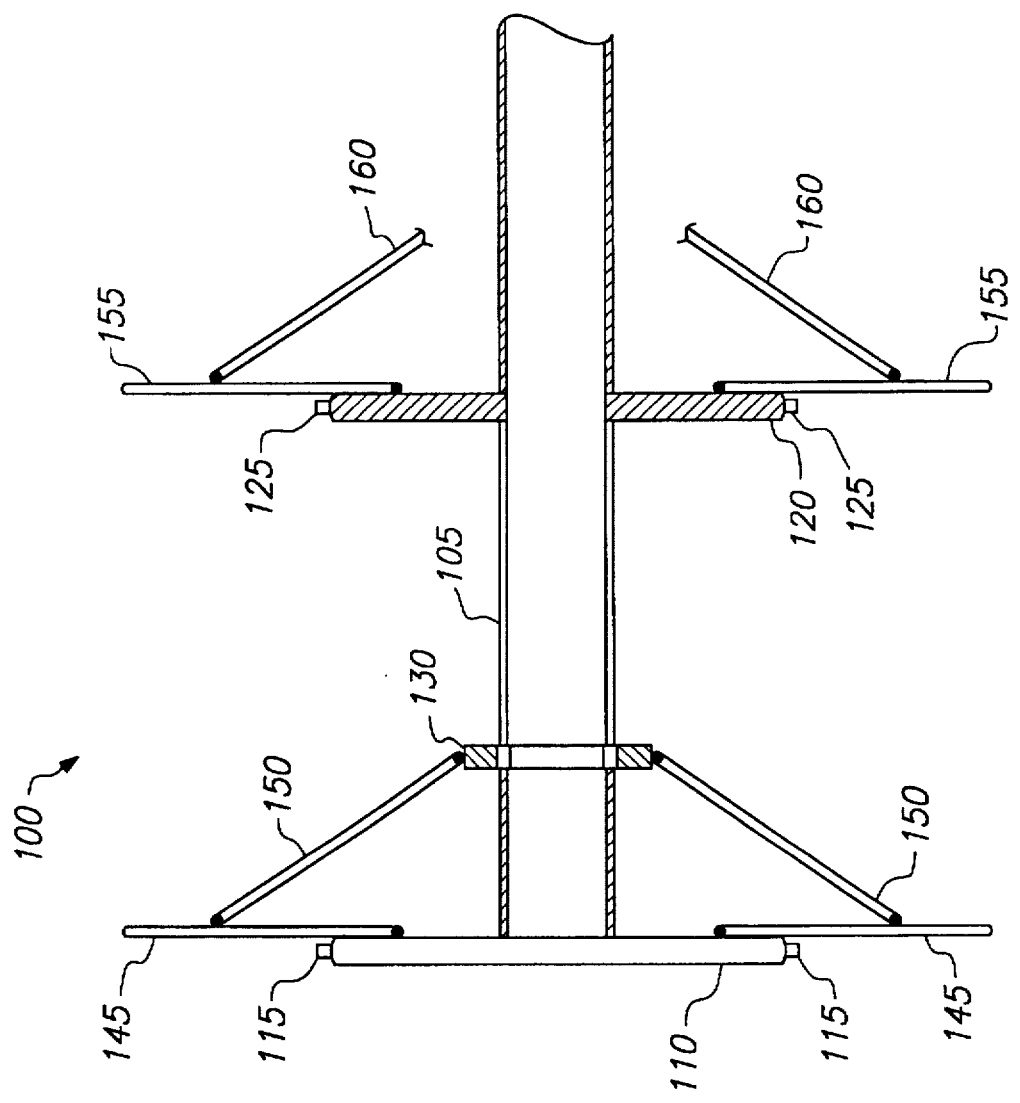
FIG. 9 is a side elevation view of one embodiment of the invention in the expanded position, showing the common elements to several embodiments.
Figure 10:
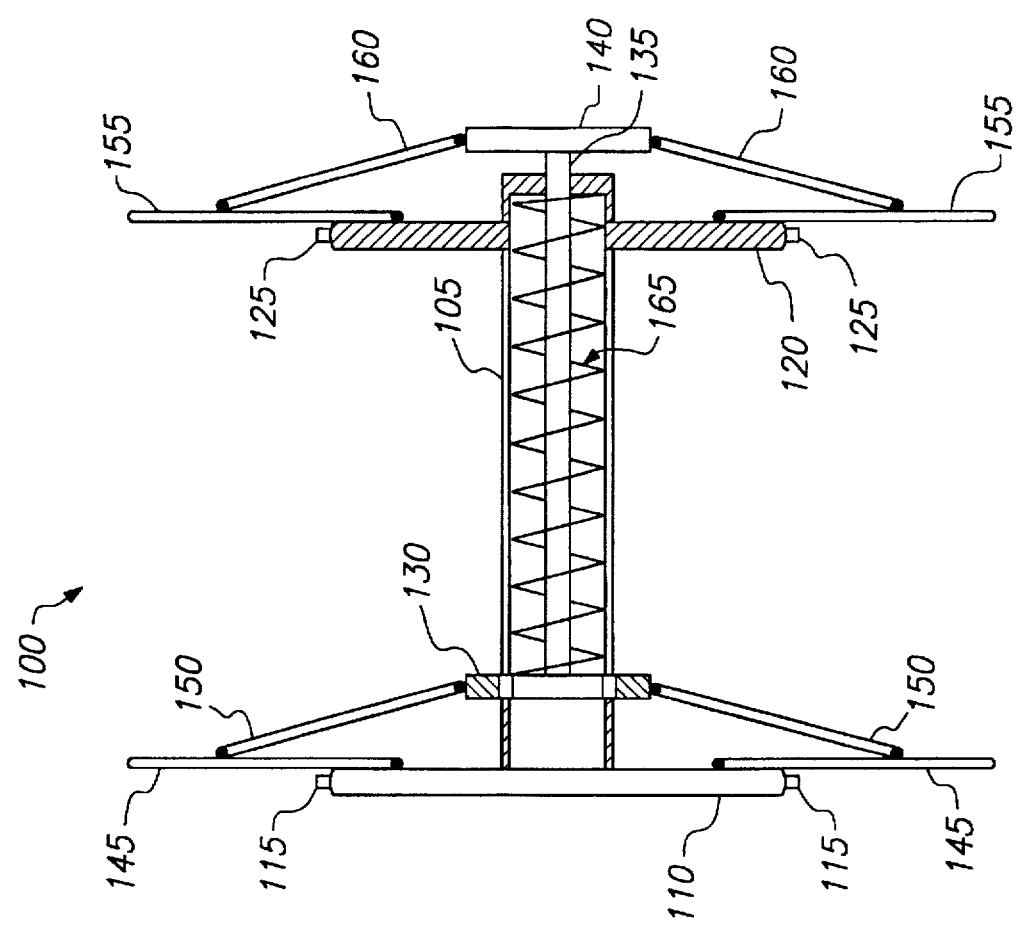
FIG. 10 is another side elevation view of one embodiment of the invention in the expanded position, showing a variation in the angle between the struts and the ribs.

FIG. 8 is another side elevation view of one embodiment of the invention in the expanded position, showing forward and rear external springs, 565 and 865, respectively. FIG. 9 is a side elevation view of one embodiment of the invention in the expanded position, showing the common elements to several embodiments. FIG. 10 is another side elevation view of one embodiment of the invention in the expanded position, showing a variation in the angle between forward ribs 145 and forward struts 150 and between rear ribs 155 and rear struts 160.

C. Operation

1. Operational Overview

The spring is compressed to retract the diaphragms and associated linkages, i.e., strut and rib members, therefore allowing the pig to be inserted into the pig launcher for the small-diameter bore portion. Due to geometry's of the components, the radial force exerted on the small-diameter bore (e.g., flexible riser) is relatively small. When retracted, the diaphragms are folded to fit within the constrained space (similar to an umbrella).

Fluid or gas pressure is applied behind the pig to propel it. On entering into the large-diameter bore portion (e.g., submarine pipeline), the force of the spring is sufficient to move the diaphragms to the deployed positions. Piston member 135 moves the collar from retracted position to deployed position (connected via slots in the body) and also moves the back set of rib members from retracted position to deployed position. This action is similar to opening an umbrella. The collar connected to the piston through the slotted body provides a torsional force to restrain the diaphragm, strut members, and rib members from rotating relative to the cylindrical body.

The pig is designed for deployment when positioned horizontally. It is recognized that deployment would be facilitated if the change in bore diameter occurs with the bore orientated at a downward inclination. Once deployed, pressure behind the pig continues to propel it along the large-diameter bore pipeline until it reaches a point where it is removed, typically through a pig receiver.

2. Operation With Reference To The Figures

Expandable pipeline pig 100 is introduced in the collapsed position shown in FIG. 1 into a top portion of a flexible export riser of an offshore oil/gas production platform. The outer diameter of front plate member 110 and rear plate member 120 is sufficiently large so that front-plate seal member 115 and rear-plate seal member 125 form at least a partial liquid/gas seal between the inner diameter of the flexible riser and the outer diameter of front plate member 110 and rear plate member 120. Also, the outer diameter of front plate member 110 and rear plate member 120 are not so large as to slow flowrate of fluid/gas through the flexible riser to a degree detrimental to operations of the production platform.

The lower end of the flexible riser connects to a submarine pipeline on the seabed. The pipeline is typically rigid and has a larger inner diameter than the inner diameter of the flexible riser. Upon passage of the expandable pipeline pig 100 into the submarine pipeline, front rib members 145 and rear rib members 155 are free to expand, i.e., the outer extremities are free to move farther away from the rear portion and longitudinal center of cylindrical body member 105. The inner extremities of the front and rear rib members 145 and 155, respectively, remain rotatably attached to front and rear plate members 110 and 120, respectively. The spring member 165 provides the motive force for deploying the pig from the smaller diameter to the larger diameter positions. This occurs by the force placed on front rib members 145 and rear rib members 155 by the end portions of front strut members 150 and rear strut members 160, respectively, which are pivotably attached to mid to end portions of front rib members 145 and rear rib members 155, respectively.

The force exerted by the strut members is generated by movement of collar member 130 toward the front portion of cylindrical body member 105. Movement of collar member 130 toward the front portion of cylindrical body member 105 is due to expansion of spring member 165.

The outer diameter of front diaphragm member 405 and rear diaphragm member 305 is sufficiently large so that front seal member 410 and rear seal member 310 form at least a partial liquid/gas seal between the inner diameter of the submarine pipeline and the outer diameter of front diaphragm member 405 and rear diaphragm member 305. Also, the outer diameter of front diaphragm member 405 and rear diaphragm member 305 are not so large as to slow flowrate of fluid/gas through the submarine pipeline to a degree detrimental to operations of the production platform.

While the preferred embodiment of the invention has been described and alternative configurations have been suggested, it should be understood that other embodiments may be devised and modifications can be made thereto without departing from the spirit of the invention and the scope of the appended claims.

D. Dimensions

Illustrative examples of the dimensions of each element for particular embodiments are as shown in Table 2 below. Thickness of each element are such as are sufficient for the material used to perform its intended function within acceptable rates of structural failure. Lengths and widths and other dimensions are chosen to accommodate the size difference between the smaller and larger risers and pipelines for which the expandable pipeline pig is intended. Methods of calculating such dimensions are known.

TABLE 2

| Element Name | Ref. # | Diameter (Inches) | Length (Inches) |
|---|---|---|---|
| A cylindrical body member | 105 | O.D. = 0.5–4, 1, 2, 3. I.D. = as required per strength of materials | 20–50, 22, 23, 24, 26, 28, 30, 36, 38, 40, 42 44 |
| A front plate member | 110 | O.D. = 10–30, 15, 16, 17 | Thickness as required per strength of materials |
| A front-plate seal member | 115 | O.D. when in place about the front plate = same as front plate member 110 plus 0.2–1 | Thickness as required per strength of materials |
| A rear plate member | 120 | O.D. same as rear plate member 110. I.D. = O.D. of cylindrical body member 105 | Thickness as required per strength of materials |
| A rear-plate seal member | 125 | O.D. when in place about the rear plate = same as rear plate member 120 plus 0.2–1 | Thickness as required per strength of materials |
| A collar member | 130 | I.D. Same as cylindrical body member 105 O.D. + allowance as required for strength | Thickness as required per strength of materials |
| A piston member | 135 | O.D. less than I.D. of cylindrical body member 105 | Same as cylindrical body member 105 |
| A piston end-plate member | 140 | O.D. < O.D. of rear plate member 120 and > id. of cylindrical body member 105 | Thickness as required per strength of materials |
| Front rib members | 145 | As needed per strength of materials | Sufficient to support front diaphragm member 405 |
| Front strut members | 150 | As needed per strength of materials | Sufficient to support front rib members 145 |
| Rear rib members | 155 | As needed per strength of materials | Sufficient to support rear diaphragm member 305 |
| Rear strut members | 160 | As needed per strength of materials | Sufficient to support rear rib members 155 |
| A spring member | 165 | O.D. < I.D. of cylindrical body member 105 and | Thickness as required per strength of |

TABLE 2-continued

| Element Name | Ref. # | Diameter (Inches) | Length (Inches) |
|---|---|---|---|
| | | I.D. > O.D. of piston member 135 | materials |
| A front diaphragm member | 405 | O.D. = 24–48, 30, 36, 40. | Thickness as required per strength of materials |
| A front seal member | 410 | O.D. in position about front diaphragm member = 405 + 0.1–1 | Thickness as required per strength of materials |
| A rear diaphragm member | 305 | Same as front diaphragm member 405 | Thickness as required per strength of materials |
| A rear seal member | 310 | Same as front seal member 410 | Thickness as required per strength of materials |
| External-forward spring member | 565 | Same as cylindrical body member plus 0.1–1. | Thickness as required per strength of materials |
| External-rear spring member | 865 | Same as external-forward spring member. | Thickness as required per strength of materials |

E. Materials

Typically, most of the rigid elements will be made of metal, e.g., aluminum or steel. The rigid elements include the cylindrical body member, struts, ribs, piston, and plates. The diaphragms are flexible since, like an umbrella, they must fold or contract while the pig is in the retracted position. The diaphragms are made of any material having sufficient strength, flexibility, and durability to perform the intended function within acceptable failure rates. Such materials include a variety of reinforced clothes. Reinforcing fibers include metal wires or cord, nylon, or kevlar. The material is not soluble to any substantial degree in the oil or gas or anti-corrosive agent used in the pipelines. Other suitable materials are known to those skilled in the art.

F. Alternative Embodiments

The pipeline expandable pig is described and illustrated based on a fluid separation application. Another embodiment is for cleaning. For cleaning deposits of soft waxes, scraping or cutting tools can be fitted at the ends of the rib members. The two sets of rib members can be radially offset to enhance cleaning. In another embodiment, scraping or cutting tools are in the seal members and/or in a separate band attached about the seal members.

If it is desired to lock the diaphragms open, an "over-center" locking arrangement can be used. However, this would complicate the expandable pipeline pig. Also, each set of strut members can be replaced by a disk connected to the piston. However, these additional disks would restrict movement of the pig through curved sections of the inner bore.

Two bores, significantly different in diameter, can be pigged. Specifically, the pig can be launched through a smaller diameter bore (such as a flexible riser) and still efficiently pig a larger diameter bore. The small-bore diameter passively keeps the diaphragm in retracted position. This avoids the need for a latching mechanism which would mechanically complicate the pig.

Movement of the pig through curves (e.g., flexible riser) is facilitated by the lack of latching (the diaphragms and rib members have some freedom of movement). Once deployed, the spring force keeps the diaphragms in place, yet allows them to contract temporarily if any obstructions are encountered, such as protruding welds. The pig can also be used for applications which require the pig to contract significantly from a larger diameter pipeline to a connected smaller diameter pipeline.

What is claimed is:

1. An expandable pipeline pig comprising:
   (a) an elongated cylindrical body member:
      (i) from about 20 inches to about 50 inches in length; and
      (ii) having at least two longitudinal slots therein;
   (b) a front plate member:
      (i) having an outer diameter of from about 10 inches to about 30 inches; and
      (ii) wherein a center portion of which is fixedly attached to a front portion of said elongated cylindrical body member;
   (c) a rear plate member:
      (i) having an outer diameter of from about 10 inches to about 30 inches; and
      (ii) a center portion of which is fixedly attached to a rear portion of said elongated cylindrical body member;
   (d) a front-plate seal member flexibly attached to outer circumference portions of said front plate member;
   (e) a rear-plate seal member flexibly attached to outer circumference portions of said rear plate member;
   (f) a collar member slidably disposed about said elongated cylindrical body member, said collar member:
      (i) having an outer portion forming a ring about said elongated cylindrical body member;
      (ii) having an inner portion of said collar member slidably disposed inside said elongated cylindrical body member; and
      (iii) wherein said outer portion of said collar member is rigidly attached to said inner portion of said collar member through said slots in said elongated cylindrical body member;
   (g) a piston member, fixedly attached to the inner portion of said collar member and wherein an opposite end of said piston member extends beyond a rear portion of said elongated cylindrical body member;
   (h) a piston end-plate member, fixedly attached to a rear portion of said piston member which extends beyond the rear portion of elongated cylindrical body member;
   (i) front rib members:
      (i) having front-end portions pivotably attached to a rear side portion of said front plate member; and
      (ii) wherein the point of such pivotable attachments is radially equidistant about the elongated cylindrical body member;
   (j) front strut members having front end portions and rear end portions:
      (i) wherein said front end portions are pivotably attached to rear-end portions of said front rib members;
      (ii) wherein said rear-end portions are pivotably attached to outer portions of said collar member, wherein the point of said pivotable attachments is radially equidistant about said elongated cylindrical body member; and
      (iii) wherein said attachment points of the rear-end portions of said front strut members substantially correspond to the radial point of attachment of said front-end portions of said front rib members which are pivotably attached to said rear side portion of said front plate member;

(k) rear rib members:
   (i) having front-end portions pivotably attached to a rear side portion of said rear plate member; and
   (ii) wherein the point of said pivotable attachments is radially equidistant about the elongated cylindrical body member;
(l) rear strut members having front end portions and rear end portions:
   (i) wherein said front end portions are pivotably attached to rear-end portions of said rear rib members;
   (ii) wherein said rear end portions are pivotably attached to outer portions of said piston end-plate member, wherein the point of said pivotable attachments is radially equidistant about said elongated cylindrical body member; and
   (iii) wherein said attachment points of the rear-end portions of said rear strut members substantially correspond to the radial point of attachment of said front-end portions of said rear rib members which are pivotably attached to said rear side portion of said rear plate member;
(m) a spring member disposed within the interior of said elongated cylindrical body member and radially about said piston member:
   (i) wherein a front portion of said spring member is biased against the inner portion of said collar member; and
   (ii) wherein a rear portion of said spring member is biased against a rear portion of said elongated cylindrical body member;
(n) a front diaphragm member:
   (i) from about 24 inches to about 48 inches in outer diameter; and
   (ii) wherein radial portions of said front diaphragm member are flexibly attached to said front rib members;
(o) a front seal member flexibly attached to outer circumference portions of said front diaphragm member;
(p) a rear diaphragm member:
   (i) from about 24 inches to about 48 inches in outer diameter; and
   (ii) wherein radial portions of said rear diaphragm member are flexibly attached to said rear rib members;
(q) a rear seal member flexibly attached to outer circumference portions of said rear diaphragm member; and
(r) wherein said elements are so disposed such that sliding said collar member toward the front of said elongated cylindrical body member, due to expansion of said spring member, results in pivoting the rear-end portions of said front and rear rib members outward from said elongated cylindrical body member such as occurs when opening an umbrella.

2. An expandable pipeline pig comprising:
(a) an elongated cylindrical body member;
(b) a front plate member, a center portion of which is fixedly attached to a front portion of elongated cylindrical body member;
(c) a rear plate member, a center portion of which is fixedly attached to a rear portion of elongated cylindrical body member;
(d) a collar member slidably disposed about said elongated cylindrical body member, said collar member:
   (i) having an outer portion forming a ring about said elongated cylindrical body member;

(e) front rib members:
   (i) having front-end portions pivotably attached to a rear side portion of said front plate member; and
   (ii) wherein the point of said pivotable attachments is radially equidistant about-the elongated cylindrical body member;
(f) front strut members having front-end portions and rear-end portions:
   (i) wherein said front-end portions are pivotably attached to rear-end portions of said front rib members;
   (ii) wherein said rear-end portions are pivotably attached to outer portions of said collar member, wherein the point of said pivotable attachments is radially equidistant about said elongated cylindrical body member; and
   (iii) wherein said attachment points of the rear-end portions of said front strut members substantially correspond to the radial point of attachment of said front-end portions of said front rib members which are pivotably attached to said rear side portion of said front plate member;
(g) rear rib members:
   (i) having front-end portions pivotably attached to a rear side portion of said rear-end plate; and
   (ii) wherein the point of said pivotable attachments is radially equidistant about the elongated cylindrical body member;
(h) rear strut means for biasing rear-end portions of said rear rib members;
(i) at least one bias means for moving said collar member toward the front of said elongated cylindrical body member, thereby deploying said front and rear rib members;
(j) a front diaphragm member, wherein radial portions of said front diaphragm member are flexibly attached to said front rib members;
(k) a rear diaphragm member, wherein radial portions of said rear diaphragm member are flexibly attached to said rear rib members; and
(l) wherein said elements are so disposed such that sliding said front and rear strut members toward the front of said elongated cylindrical body member, due to expansion of said bias means, results in pivoting the rear-end portions of said front and rear rib members outward from said elongated cylindrical body member such as occurs when opening an umbrella.

3. The expandable pipeline pig of claim 2, wherein:
(a) said rear strut means comprises rear strut members having front-end portions and rear-end portions; and
(b) wherein said front-end portions are pivotably attached to rear-end portions of said rear rib members.

4. The expandable pipeline pig of claim 3:
(a) wherein said elongated cylindrical body member has at least two longitudinal slots therein;
(b) wherein said collar member further comprises an inner portion slidably disposed inside said elongated cylindrical body member, and wherein said outer portion and said inner portion of said collar member are rigidly connected through said longitudinal slots in said elongated cylindrical body member; and
(c) further comprising a piston member, fixedly attached to the inner portion of said collar member and wherein an opposite end of said piston member extends beyond a rear portion of said elongated cylindrical body member.

5. The expandable pipeline pig of claim 4:
(a) further comprising a piston end-plate member, fixedly attached to said rear portion of said piston member which extends beyond the rear portion of said elongated cylindrical body member; and
(b) wherein said rear portions of said rear strut members are pivotably attached to outer portions of said piston end-plate member, wherein the point of said pivotable attachments is radially equidistant about said elongated cylindrical body member.

6. The expandable pipeline pig of claim 2, further comprising a front-plate seal member flexibly attached to outer circumference portions of said front-plate member.

7. The expandable pipeline pig of claim 6, further comprising a rear-plate seal member flexibly attached to outer circumference portions of said rear-plate member.

8. The expandable pipeline pig of claim 2, further comprising a front seal member flexibly attached to outer circumference portions of said front diaphragm member.

9. The expandable pipeline pig of claim 8, further comprising a rear seal member flexibly attached to outer circumference portions of said rear diaphragm member.

10. The expandable pipeline pig of claim 2, wherein said bias means comprises a spring member disposed within the interior of said elongated cylindrical body member and radially about said piston member.

11. The expandable pipeline pig of claim 10, wherein a front portion of said spring member is biased against the inner portion of said collar member; and wherein a rear portion of spring member is biased against a rear portion of said elongated cylindrical body member.

12. The expandable pipeline pig of claim 2, wherein said elongated cylindrical body member is from about 20 inches to about 50 inches in length.

13. The expandable pipeline pig of claim 2, wherein said front plate member and said rear plate member are each from about 10 inches to about 30 inches in outer diameter.

14. The expandable pipeline pig of claim 2, wherein said front diaphragm member and said rear diaphragm member are each from about 24 inches to about 48 inches in outer diameter.

15. A method for separating different liquids and gases in a flexible oil/gas export riser which feeds to a larger diameter rigid oil/gas export pipeline, said method comprising:
(a) passing a first expandable pipeline pig in a retracted position into an upper portion of said export riser;
(b) passing said first expandable pipeline pig from a lower portion of said export riser into said larger diameter rigid oil/gas export pipeline;
(c) expanding said first expandable pipeline pig; wherein said first expandable pipeline pig is adapted to separate different liquids and gases;
(d) wherein said first expandable pipeline pig comprises:
(i) an elongated cylindrical body member, from about 20 inches to about 50 inches in length;
(ii) a front plate member, a center portion of which is fixedly attached to a front portion of said elongated cylindrical body member;
(iii) a rear plate member, a center portion of which is fixedly attached to a rear portion of said elongated cylindrical body member;
(iv) a collar member slidably disposed about said elongated cylindrical body member, said collar member:
(a) having an outer portion forming a ring about said elongated cylindrical body member;

(v) front rib members:
(a) having front-end portions pivotably attached to a rear side portion of said front plate member; and
(b) wherein the point of said pivotable attachments is radially equidistant about the elongated cylindrical body member;
(vi) front strut members having front-end portions and rear-end portions:
(a) wherein said front-end portions are pivotably attached to rear-end portions of said front rib members;
(b) wherein said rear-end portions are pivotably attached to outer portions of said collar member, wherein the point of said pivotable attachments is radially equidistant about said elongated cylindrical body member; and
(c) wherein said attachment points of the rear-end portions of said front strut members substantially correspond to the radial point of attachment of said front-end portions of said front rib members which are pivotably attached to said rear side portion of said front plate member;
(vii) rear rib members:
(a) having front-end portions pivotably attached to a rear side portion of said rear plate member; and
(b) wherein the point of said pivotable attachments is radially equidistant about the elongated cylindrical body member;
(viii) rear strut means for biasing rear-end portions of said rear rib members;.
(ix) at least one bias means for moving said collar member toward the front of said elongated cylindrical body member, thereby deploying said front and rear rib members;
(x) a front diaphragm member, wherein radial portions of said front diaphragm member are flexibly attached to said front rib members;
(xi) a rear diaphragm member, wherein radial portions of said rear diaphragm member are flexibly attached to said rear rib members; and
(xii) wherein said elements are so disposed such that sliding said front and rear strut members toward the front of said elongated cylindrical body member, due to expansion of said bias means, results in pivoting the rear end portions of said front and rear rib members outward from said elongated cylindrical body member such as occurs when opening an umbrella.

16. The method of claim 15:
(a) further comprising:
(i) after said first expandable pipeline pig is passed in a retracted position into an upper portion of said export riser, feeding an anti-corrosion agent to said upper portion of said export riser;
(ii) after said anti-corrosion agent is passed to said upper portion of said export riser, passing a second expandable pipeline pig in a retracted position into an upper portion of said export riser;
(iii) passing said second expandable pipeline pig from a lower portion of said export riser into said larger diameter rigid oil/gas export pipeline;
(iv) expanding said second expandable pipeline pig; and
(b) wherein:
(i) said rear strut means comprises rear strut members having front-end portions and rear-end portions; and
(ii) wherein, said front-end portions are pivotably attached to rear-end portions of said rear rib members.

17. The method of claim 16, further comprising:

(a) a front-plate seal member flexibly attached to outer circumference portions of said front plate member;

(b) and a rear-plate seal member flexibly attached to outer circumference portions of said rear plate member; and (c) wherein said front plate member and said rear plate member are each from about 10 inches to about 30 inches in outer diameter.

18. The method of claim 16, further comprising:

(a) a front seal member flexibly attached to outer circumference portions of said front diaphragm member;

(b) a rear seal member flexibly attached to outer circumference portions of said rear diaphragm member; and (c) wherein said front diaphragm member and said rear diaphragm member are each from about 24 inches to about 48 inches in outer diameter.

19. The method of claim 16:

(a) wherein said elongated cylindrical body member has at least two longitudinal slots therein;

(b) wherein said collar member further comprises an inner portion slidably disposed inside said elongated cylindrical body member, and wherein said outer portion and said inner portion of said collar member are rigidly connected through said longitudinal slots in said elongated cylindrical body member; and (c) further comprising a piston member, fixedly attached to the inner portion of said collar member and wherein an opposite end of said piston member extends beyond a rear portion of said elongated cylindrical body member.

20. The method of claim 19:

(a) wherein said bias means comprises a spring member disposed within the interior of said elongated cylindrical body member and radially about said piston member;

(b) wherein a front portion of said spring member is biased against the inner portion of said collar member; and wherein a rear portion of said spring member is biased against a rear portion of said elongated cylindrical body member;

(c) further comprising a piston end-plate member, fixedly attached to said rear portion of said piston member which extends beyond the rear portion of said elongated cylindrical body member; and (d) wherein said rear portions of said rear strut members are pivotably attached to outer portions of said piston end-plate member, wherein the point of said pivotable attachments is radially equidistant about said elongated cylindrical body member.

* * * * *